United States Patent
Chen et al.

(10) Patent No.: US 8,224,968 B1
(45) Date of Patent: Jul. 17, 2012

(54) METHOD AND SYSTEM FOR SCALABLE CONTENT STORAGE AND DELIVERY

(75) Inventors: Songqing Chen, Fairfax, VA (US);
Xiaoning Ding, Williamsburg, VA (US);
Lei Guo, Williamsburg, VA (US);
Enhua Tan, Williamsburg, VA (US);
Zhen Xiao, Randolph, NJ (US);
Xiaodong Zhang, Williamsburg, VA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 856 days.

(21) Appl. No.: 11/230,187

(22) Filed: Sep. 19, 2005

(51) Int. Cl.
*G06F 15/16* (2006.01)
*G06F 15/173* (2006.01)

(52) U.S. Cl. ........ 709/227; 709/203; 709/204; 709/217; 709/223

(58) Field of Classification Search ............... 709/227, 709/217–219
See application file for complete search history.

(56) References Cited

U.S. PATENT DOCUMENTS

| | | | |
|---|---|---|---|
| 5,761,421 A | 6/1998 | van Hoff et al. | |
| 5,806,075 A | 9/1998 | Jain et al. | |
| 5,944,783 A | 8/1999 | Nieten | |
| 6,219,710 B1 | 4/2001 | Gray et al. | |
| 6,892,210 B1 | 5/2005 | Erickson et al. | |
| 7,174,385 B2 * | 2/2007 | Li | 709/231 |
| 7,363,498 B2 * | 4/2008 | Hennessey et al. | 713/176 |
| 2003/0055898 A1 * | 3/2003 | Yeager et al. | 709/205 |
| 2003/0055908 A1 * | 3/2003 | Brown et al. | 709/207 |
| 2005/0198020 A1 * | 9/2005 | Garland et al. | 707/3 |
| 2006/0212542 A1 * | 9/2006 | Fang et al. | 709/219 |
| 2006/0218222 A1 * | 9/2006 | Brahmbhatt et al. | 709/201 |
| 2007/0061863 A1 * | 3/2007 | Rajasekaran | 726/2 |
| 2007/0130361 A1 * | 6/2007 | Li | 709/231 |

* cited by examiner

*Primary Examiner* — Ian N Moore
*Assistant Examiner* — Jenee Alexander

(57) ABSTRACT

A peer-to-peer communication system in which a peer communicating with a tracker node on a local torrent can locate and download files that are not currently available from other peers communicating on the local torrent. To enable this, the tracker node maintains collaboration information for a list of files. The collaboration information includes, for each file, a list of locations at which a full copy of the file may be located. The list of locations may include active peers, dormant peers and remote tracker nodes. The collaboration information may be obtained from each peer when it joins a local torrent. Upon joining the torrent, the peer may provide the local tracker node with a list of files that it is willing to serve.

12 Claims, 2 Drawing Sheets

FIG. 3    31

| FILE NAME | ACTIVE PEER | DORMANT PEERS | REMOTE TRACKER NODES |
|-----------|-------------|---------------|----------------------|
| A | ≡ | ≡ | ≡ |
| B | ≡ | ≡ | ≡ |
| C | ≡ | ≡ | ≡ |
| ⋮ | ⋮ | ⋮ | ⋮ |

METHOD AND SYSTEM FOR SCALABLE CONTENT STORAGE AND DELIVERY

BACKGROUND OF THE INVENTION

The present invention is directed to a data delivery system. More specifically, the present invention is directed to a peer-to-peer system for delivering data in a reliable and cost-effective manner.

The sheer amount of content on the Internet has grown dramatically during the past several decades. With the increasing popularity of multimedia objects like audio or video, this trend is expected to accelerate in the future. The efficient storage and distribution of these large objects is a challenging problem. The traditional approach of storing them in large data centers is expensive due to the high maintenance cost of those data centers. In addition, transmitting those objects from the data centers to end users, through a client-server-like system, can consume a prohibitive amount of bandwidth from one source.

One solution to the high bandwidth/high maintenance problem associated with such large data centers is a peer-to-peer (P2P) communication system. Examples of P2P systems include Napster®, Gnutella®, Kazaa®, and eDonkey®. In such systems, end users (i.e., peers) interested in file sharing participate as both clients and servers through an application overlay network. When a user locates an interesting file from another user, the downloading happens directly between the two without going through a central server.

One common problem with early P2P systems is "free riding". Free riding occurs when a peer downloads files from others, but does not contribute or make its own files available to others. It has been observed that a large percentage of peers in such early P2P systems were free riders. To cut down on free-riding, some systems such as KaZaa use "participation levels" to track the contribution of each peer and give higher service priority to peers who contributed more. However, such systems have been proven to be very easy to circumvent without having to contribute.

A more recent P2P communications system that has been somewhat successful in preventing free-riding is a BitTorrent® system. In a BitTorrent® system, the original content provider creates a "meta file" (with the .torrent suffix name) for the "torrent file" (i.e. the data or content) it wants to share, and publishes the meta file on a Web site. Then, the content provider starts a peer-to-peer application called a client application with a full copy of the torrent file as the original seed. For each torrent file, there is a tracker site, or tracker node, whose URL is encoded in the meta file, to help peers find each other to exchange the file chunks. A peer that has downloaded the file completely also becomes a seed that could, in turn, provide downloading service to other peers. All peers sharing the torrent file in the system, including downloaders and seeds, self organize into a peer-to-peer network known as a torrent. There are many dedicated tracker sites on the Internet which may host thousands of torrents each.

An illustration of a prior art torrent 10 is shown in FIG. 1. As shown, torrent 10 is composed of a tracker node 11 and a plurality of peers 12 that are interested in sharing a particular file. The peers 12 are essentially nodes in torrent 10 that are running a client application for communicating with tracker node 11. Tracker node 11 contains information including a list of torrent files that are available for downloading and the identification of each peer 12 from which a particular torrent file can be downloaded. In this way, any peer 12 can use the information in tracker node 11 to locate and download an entire torrent file from any other peer 12 or it can download chunks of a torrent file from a plurality of peers 12, in parallel. As a result, as long as at least one of the peers 12 on torrent 10 is willing to serve, or make available, the file, the other peers 12 can download the file without the need for storing the file in a large data center. In addition, if multiple peers 12 make a particular file available on torrent 10, then the file can be downloaded from a number of different peers 12 in chunks, thereby spreading the consumption of bandwidth among the peers 12.

To prevent the "free riding" problem found in other P2P systems, BitTorrent® systems use a "tit-for-tat" incentive mechanism. Basically, the incentive is that each peer is provided with more download bandwidth as it increases its upload bandwidth. That is, the more a peer allows other peers to download its files, the more bandwidth the system allocates to the peer for downloading files from others. This ensures that peers with high uploading bandwidth also have corresponding high downloading bandwidth. Because each new participant brings extra resources to the distribution, this approach is highly scalable for a large number of users. This is in contrast to a client-server model where the capacity of the server is usually the bottleneck for a highly popular object. As a result, BitTorrent®-like systems are now widely used for large file distribution, such as the distribution of large software packages.

Although the incentive mechanism in current BitTorrent® systems encourages a peer to exchange file chunks with other peers in its local torrent, once the peer has finished downloading the file and become a seed (a peer having a full copy of the file), it has no incentive to stay in the torrent. This is due to the fact that the torrent is basically set up for the exchange of a particular file and once a peer has a complete copy of the file it has no reason to stay in the torrent other than to let others download the file from it. Thus, as more and more peers download a complete copy of the file, the performance of the torrent deteriorates to the point that it becomes difficult for the file to be located and downloaded. As a result, current BitTorrent® systems are not desirable for downloading older files.

In addition, current BitTorrent® systems do not provide a built-in search method. Instead, BitTorrent® users rely on Web-based search engines to locate the content they want to download. As a result, although peers within the same torrent cooperate in the distribution of a particular file, peers in different torrents cannot collaborate with each other because they have no way of finding and communicating with each other. Therefore, in current BitTorrent systems, a peer needs to search for and join a new torrent each time it wants to download a different file.

BRIEF SUMMARY OF THE INVENTION

The present invention provides a peer-to-peer system in which a peer in a local torrent can locate and exchange files with other peers in its local torrent as well as peers in other torrents. The present invention is accomplished by storing "collaboration information" at the tracker node in the local torrent. The collaboration information enables the tracker node to keep track of the location of files made available by peers on its local torrent as well as the location of files that are unavailable on the local torrent, but available elsewhere. Thus, when a peer on the local torrent desires to download a file, the file may be located and downloaded even if it is not available from another peer on the local torrent. Once such an unavailable file is located, the peer seeking the file can establish a peer-to-peer communication to download the file without the need to use a Web-based search engine.

In accordance with an embodiment of the invention, the collaboration information at a tracker node in a local torrent includes a list of files. The list of files includes files that are currently available for download from another peer on the local torrent or on a remote torrent. For each file, the tracker node keeps: (1) a list of peers on the current torrent that are willing to serve the file (such peers are referred to herein as active peers); (2) a list of peers that store a full copy of the file but no longer participate in the current torrent (such peers are referred to herein as dormant peers); and (3) a list of remote tracker nodes which host the torrent file or have information about peers where the file may be stored. Thus, depending on which torrents it is currently participating, a local peer may be listed as an active peer for one file and as a dormant peer for another file.

In such an embodiment, when a local peer desires to locate and download a file, it queries its local tracker node for a list of locations from which the file may be downloaded. If the file is available at an active peer, the requesting peer can establish a peer-to-peer communication with the active peer and download the file therefrom. This process is the same as in the existing BitTorrent system. If the file is not available at an active peer, the tracker node has two options; it may contact some of the listed dormant peers to see if they are willing to make the file available, and/or it may contact a remote tracker node listed for the file. If the file is made available by a dormant peer and/or at a remote torrent (as reported by a remote tracker node), the local peer can then establish a peer-to-peer communication with the dormant peer or a peer on the remote torrent, and download the file therefrom. As a result, the local peer can locate and download files that are not available on its current torrent from both dormant peers and peers in other torrents.

These and other advantages of the invention will be apparent to those of ordinary skill in the art by reference to the following detailed description and the accompanying drawings.

BRIEF DESCRIPTION OF THE DRAWINGS

FIG. 3 illustrates an embodiment of the collaboration information maintained in each tracker node shown in the peer-to-peer system of FIG. 2.

DETAILED DESCRIPTION

Figure 2:
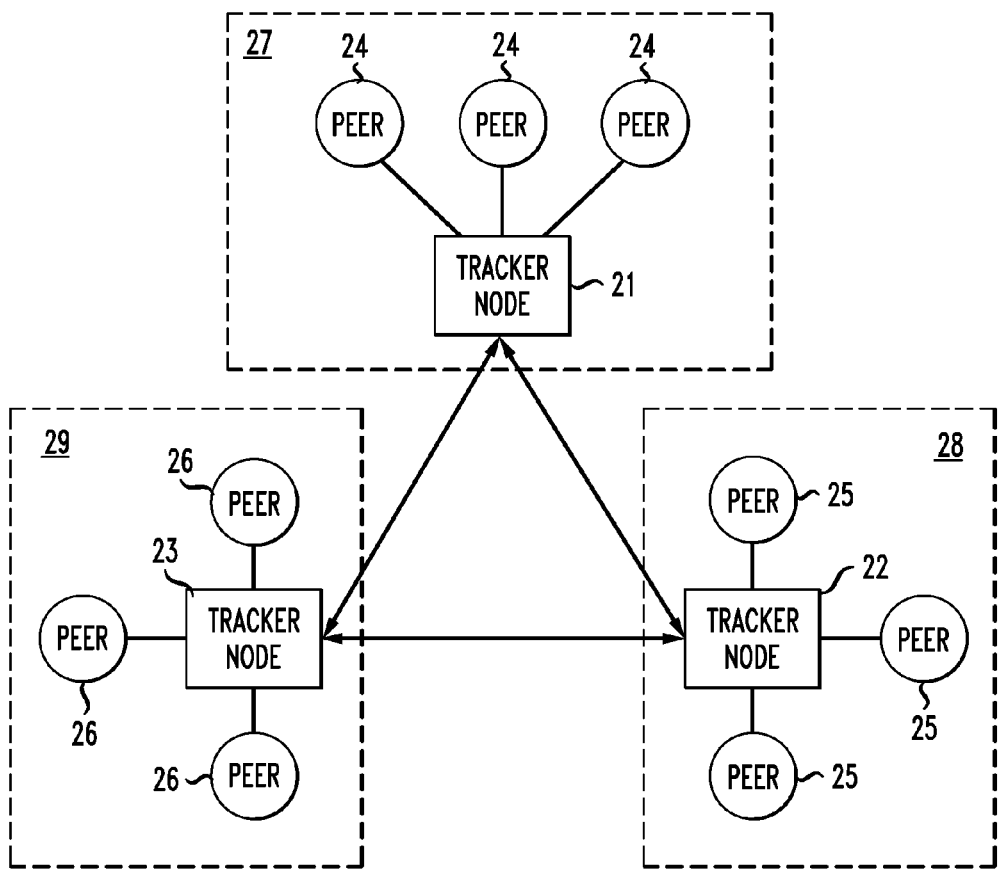
FIG. 2 illustrates a peer-to-peer system in accordance with the present invention.

FIG. 2 shows an embodiment of a peer-to-peer communications system 20 in accordance with the present invention. As shown, system 20 is composed of torrents 27, 28 and 29. Torrent 27 has peers 24 communicating with tracker node 21. Torrent 28 has peers 25 communicating with tracker node 22. Torrent 29 has peers 26 communicating with tracker node 23. Each Peer 24, 25 and 26 is a node running a client application operable for communicating with their respective tracker nodes 21, 22, and 23 and for establishing point-to-point communications.

Figure 1:
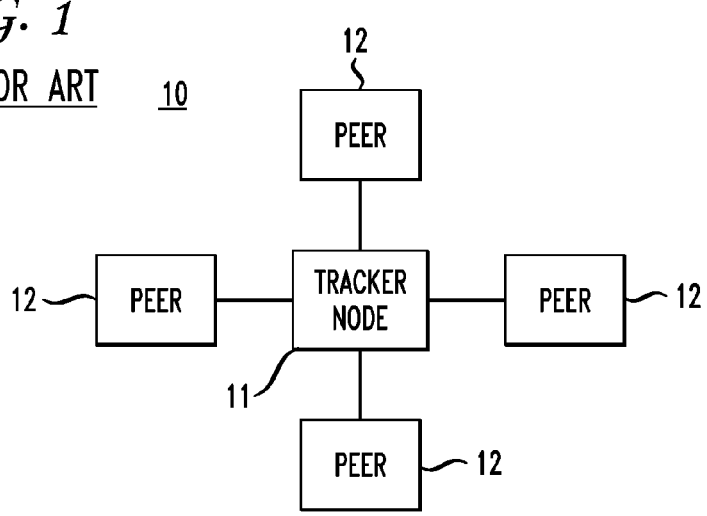
FIG. 1 shows a prior art configuration of a torrent system.

It should be understood that each torrent 27, 28 and 29 operates in a similar manner. Thus, by describing the operation of torrent 27 as an example, we also describe the operation of torrents 28 and 29. In torrent 27, peers 24 are operable to communicate with tracker node 21 to locate and download available files from each other through a peer-to peer communication. A download for a particular file can be from one of the peers 24 or from a plurality of the peers 24 in parallel. Such intra-torrent locating and downloading operations are well known in the art. For example, as described above and shown in FIG. 1, present-day torrent systems provide the ability for peers in a particular torrent to locate and download available files from other peers in the same torrent.

In accordance with the present invention, however, peers 24 and tracker node 21 have additional capabilities that do not exist in such present-day torrent systems. One additional capability is that peers 24 can locate files that are currently unavailable from peers on torrent 27. To do this, tracker node 21 is operable to maintain collaboration information for files that are available from peers on torrent 27 and files that are not available from peers on torrent 27. An example of such collaboration information is shown in FIG. 3. As shown, collaboration information 31 includes a list of files. For each file there is a list of active peers, a list of dormant peers, and a list of remote tracker nodes at which the file may be located and downloaded from. The active peers are the peers on the current torrent that are willing to serve the file (these are files we refer to as being currently available from peers in the local torrent). The dormant peers are the peers that store a full copy of the file but are not actively participating in the torrent any more. The remote tracker nodes are the trackers nodes communicating with peers in other torrents.

Although we show in FIG. 3 and describe herein an example of collaboration information 31, it should be understood that collaboration information 31 may include other information that may help a peer locate and download files that are not currently available for download from other peers on the local torrent. In addition, it should be understood that collaboration information 31 is not limited to the format shown in FIG. 3, it may be stored in any format usable to help locate the files being sought and served by the local peers.

One way to gather collaboration information 31 is for tracker node 27 to gather file information from peers 24 as they join torrent 27. For example, when peer 24 first joins torrent 27, it sends to tracker node 21 a list of files it can serve. For example, these could be files the peer has downloaded from torrents it joined previously. Tracker node 21 then lists peer 24 as a dormant peer for each file that it can serve if peer 24 is no longer an active participant of the corresponding torrent. In order to help remote tracker nodes 22 and 23 gather their own collaboration information, tracker node 21 may also announce the list of available files to remote tracker nodes 22 and 23. Tracker nodes 22 and 23 can then list tracker node 21 as a remote tracker node for each of the files that are available from peers 24. Since peer 24 may periodically download additional files and/or delete previously available files, peer 24 may periodically update its local file list with tracker node 21 which, in turn, will periodically update remote tracker nodes 22 and 23. When a peer 24 leaves torrent 27, tracker node 21 may remove it from the active peer and dormant peer lists for each file listed in its collaboration information. In addition, if peer 24 was the only local peer from which a particular file was available at torrent 27, tracker node 21 may also announce the unavailability of the file to remote tracker nodes 22 and 23.

In operation, when peer 24 wants to download a file it first checks with tracker node 21 to see if the file is available for download from the other peers 24 that are listed as active peers for the file. If so, peer 24 will establish a peer-to-peer communication with one or more of the active peer 24 to download the file. This operation is well known in the art (e.g., present-day torrent systems). If, however, the file is not available from one or more of the active peers on torrent 27, in accordance with an aspect of the invention, peer 24 will send a request to tracker node 21 to locate the file. When it receives the request, trackers node 21 will look at its collaboration information to see if a dormant peer or a remote tracker node is listed for the file. If a dormant peer is listed, tracker node 21 can send the dormant peer a request for it to make the file available for download to the requesting peer. The dormant peer can deny or accept the request. If a remote tracker node is listed, tracker node 21 can send the remote trackers node a request for the address of the peer on the remote torrent from which the file is available. The remote peer can deny or accept the request. If the request to the dormant peer and/or the remote tracker node is accepted, then the requesting peer may establish a peer-to-peer communication to download the file therefrom.

Similarly, when tracker node 21 receives a request from a remote tracker node to download a file in which a peer 24 is listed as an active peer on torrent 27, tracker node 21 will ask the active peer 24 whether it is willing to make the file available to a peer on the remote torrent. If so, tracker node 21 will send the location of active peer 24 to the remote tracker node. If not, tracker node 21 will deny the request.

As stated above, it is recognized that a peer in a remote torrent and/or a dormant peer may deny a request to make a file available to a peer in a local torrent. When this happens, the local tracker node may decide to provide the requesting local peer with the information needed for the requesting peer to negotiate directly with the peer on the remote torrent and/or the dormant peer. Such negotiations may involve the requesting peer to offer additional files to the dormant peer and/or the remote peer.

In an alternate embodiment of the invention, instead of the local tracker node sending the initial request to the dormant peer and/or the remote tracker node, the local tracker node may provide the requesting peer to make the initial contact directly with the dormant peer and/or the remote tracker node. In such an embodiment, the requesting peer may send a request to the remote tracker node and/or the dormant peer. In doing so, the requesting peer may attach to the request a list of files it can offer. In such an embodiment, only those remote peers who are interested in the offered files will respond.

Figure 4:
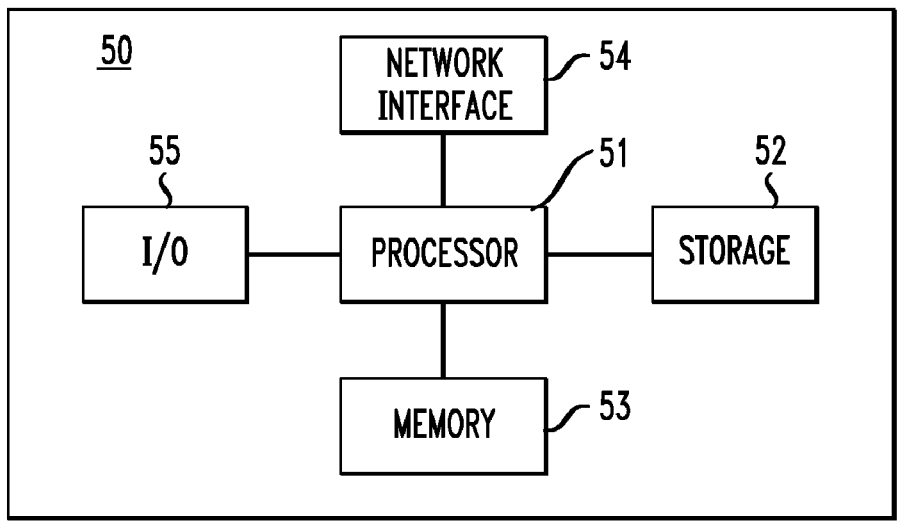
FIG. 4 shows an implementation of a device that may operate as a tracker node or a peer node.

It should be understood that tracker nodes 21, 22 and 23, and peers 24, 25, and 26 may be computers executing a torrent application to perform the above described functions. Such computers executing a torrent application are well known in the art, and may be implemented, for example, using well known computer processors, memory units, storage devices, computer software, and other components. A high level block diagram of such a computer 50 is shown in FIG. 4. As shown, computer 50 contains a processor 51 which controls the overall operation of computer 50 by executing computer program instruction which define the torrent application. The computer program instructions may be stored in a storage device 52 (e.g. a magnetic disk) and loaded into memory 53 when execution of the computer program instructions is desired. Thus, the torrent application will be defined by computer program instructions stored in memory 53 and/or storage device 52 and the torrent application will be controlled by processor 51 executing the computer program instructions. Computer 50 also includes one or more network interfaces 54 for communicating with other devices via a network. Computer 50 also includes input/output 55 which represents devices (e.g., display, keyboard, mouse, speakers, buttons, etc.) that allow for user interaction with computer 50. One skilled in the art will recognize that an implementation of an actual computer will contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. In a peer-to-peer communication system having a local tracker node communicating with a set of local peers to form a local torrent, a method comprising the steps of:
 storing, by the local tracker node, collaboration information related to a list of files, the collaboration information including, for each respective file in the list of files, a first list of local peers actively participating in the local torrent and a second list of dormant peers, wherein each dormant peer is currently participating in a second torrent, previously participated in the local torrent, is not currently participating in the local torrent, and stores the respective file, the files including an unavailable file which is unavailable from the local peers actively participating and is stored at a dormant peer;
 receiving from a local peer a first request for a file;
 determining whether the file requested is available from local peers actively participating listed on the first list;
 selecting the dormant peer from the second list, when it is determined that the file requested is unavailable from local peers actively participating listed on the first list;
 sending to the dormant peer selected from the second list a second request for the file requested;
 enabling the establishment of a communication between the local peer and the dormant peer selected from the second list, if the dormant peer accepts the second request; and
 if the dormant peer selected from the second list denies the second request:
  providing to the requesting local peer the information needed for the requesting local peer to negotiate directly with the dormant peer in the second torrent, such that the requesting local peer offers additional files to the dormant peer.

2. The method of claim 1 further comprising the step of receiving from a local peer a list of available files.

3. The method of claim 2 wherein the collaboration information includes, for each of the files, a list of locations at which a full copy of the file is located.

4. The method of claim 3 wherein the list of locations for a file comprises a list of remote tracker nodes having peers that can serve the file to other peers in a remote torrent.

5. The method of claim 4 further comprising the steps of:
 receiving from a local peer a third request to locate a file that is currently unavailable for download from another local peer on the local torrent;
 sending the third request to the remote tracker node listed in the collaboration information for the requested file, the third request being for an address of a peer in the remote torrent that is willing to provide the requesting local peer with access the requested file;

receiving the requested address of the peer located in the remote torrent; and forwarding the received address to the local peer.

6. The method of claim 4 further comprising the steps of:

receiving from the local peer a third request to locate another file that is currently unavailable for download from another local peer on the local torrent; and sending to the requesting local peer a further list of dormant peers and remote tracker nodes listed in the collaboration information for the requested file.

7. A non-transitory computer readable recording medium comprising computer program instructions stored therein which, when executed by a processor, define the steps of:

storing collaboration information related to the location of a list of files, the collaboration information including, for each respective file in the list of files, a first list of local peers actively participating in the local torrent and a second list of dormant peers, wherein each dormant peer is currently participating in a second torrent, previously participated in the local torrent, and each dormant peer is not currently participating in the local torrent, and stores the respective file, the files including an unavailable file which is unavailable from the local peers actively participating and is stored at a dormant peer;

receiving from a local peer a first request for a file;

determining whether the file requested is available from local peers actively participating listed on the first list;

selecting the dormant peer from the second list, when it is determined that the file requested is unavailable from the local peers actively participating listed on the first list;

sending to the dormant peer selected from the second list a second request for the file requested;

enabling the establishment of a communication between the local peer and the dormant peer selected from the second list, if the dormant peer accepts the second request; and if the dormant peer selected from the second list denies the second request:

providing to the requesting local peer the information needed for the requesting local peer to negotiate directly with the dormant peer in the second torrent, such that the requesting local peer offers additional files to the dormant peer.

8. The non-transitory computer readable recording medium of claim 7 wherein the program instructions further define the step of receiving from a local peer a list of available files.

9. The non-transitory computer readable recording medium of claim 8 wherein the collaboration information includes, for each of the files, a list of locations at which a full copy of the file is located.

10. The non-transitory computer readable recording medium of claim 9 wherein the list of locations for a file comprises having peers that can serve the file to other peers in a remote torrent.

11. The non-transitory computer readable recording medium of claim 10 wherein the program instructions further define the steps of:

receiving from a local peer a third request to locate a file that is currently unavailable for download from another local peer on the local torrent;

sending the third request to the remote tracker node listed in the collaboration information for the requested file, the third request being a request for an address of a peer in the remote torrent that is willing to provide the requesting local peer with access the file requested;

receiving the requested address of the peer in the remote torrent; and forwarding the received address to the local peer.

12. The non-transitory computer readable recording medium of claim 10 wherein the program instructions further define the steps of:

receiving from the local peer a third request to locate a file that is currently unavailable for download from another local peer on the local torrent; and sending to the requesting local peer a list of dormant peers, including the dormant peer at which the unavailable files are stored, and remote tracker nodes listed in the collaboration information for the file requested.

* * * * *